US006243681B1

(12) United States Patent
Guji et al.

(10) Patent No.: US 6,243,681 B1
(45) Date of Patent: Jun. 5, 2001

(54) MULTIPLE LANGUAGE SPEECH SYNTHESIZER

(75) Inventors: Yoshiki Guji; Koji Ohtsuki, both of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/525,057

(22) Filed: Mar. 14, 2000

(30) Foreign Application Priority Data

Apr. 19, 1999 (JP) ................................................ 11-110309

(51) Int. Cl.[7] ........................... G06F 17/28; G06F 15/16; G10L 13/00; H04M 11/10

(52) U.S. Cl. ............................. 704/260; 704/258; 704/3; 704/2; 455/412; 709/217; 709/206; 709/207

(58) Field of Search ................................... 704/2, 8, 277, 704/220, 260; 379/289, 290; 707/4; D14/158

(56) References Cited

U.S. PATENT DOCUMENTS 4,829,580 * 5/1989 Church .................................... 704/8
5,412,712 * 5/1995 Jennings .................................. 704/8
5,615,301 * 3/1997 Rivers .................................. 704/277
5,991,711 * 11/1999 Seno et al. ........................... 704/277
6,085,162 * 7/2000 Cherny ................................ 704/277

OTHER PUBLICATIONS

Systranet™ (Systran Translation Technologies) advertisement, Jul. 2000.*

* cited by examiner

*Primary Examiner*—Richemond Dorvil
*Assistant Examiner*—Daniel A. Nolan
(74) *Attorney, Agent, or Firm*—Venable; Robert J. Frank; Jeffrey W. Gluck

(57) ABSTRACT

In a speech synthesizer for converting text data to speech data, it is possible to realize high quality speech output even if the text data to be converted is in many languages. The speech synthesizer is provided with a plurality of speech synthesizers for converting text data to speech data and each speech synthesizer converts text data of a different language to speech data in that language. For conversion of particular text data to speech data, one of the plurality of speech synthesizers is selected and caused to carry out that conversion.

21 Claims, 6 Drawing Sheets

Schematic diagram of system structure of second embodiment

Schematic diagram of system structure of first embodiment

Schematic diagram of system structure of second embodiment

Schematic diagram of system structure of third embodiment

MULTIPLE LANGUAGE SPEECH SYNTHESIZER

BACKGROUND OF THE INVENTION

1. Field of the Invention

The present invention relates to a speech synthesizer for converting text data to speech data and outputting the data, and particularly to a speech synthesizer that can be used in CTI (Computer Telephony Integration) systems.

2. Description of the Related Art

In recent years, speech synthesizers for artificially making and outputting speech using digital signal processing techniques have become widespread. In particular, in CTI systems that implement a phone handling service providing a high degree of customer satisfaction integrating computer systems and telephone systems, use of a speech synthesizer makes it possible to provide the contents of electronic mail etc. transferred across a computer network as speech output through a telephone on the public network.

A speech output service (called a unified message service hereafter) in such a CTI system is implemented as described in the following. For example, when voice output is carried out for electronic mail, a CTI server constituting the CTI system co-operates with a mail server responsible for the electronic mail, and in response to a call arrival signal from a telephone on the public network, electronic mail at an address indicated at the time of the call arrival signal is acquired from the mail server, and at the same time text data contained in that electronic mail is converted to speech data using a speech synthesizer installed in the CTI server. By transmitting the speech data after conversion to the telephone of the caller, the CTI server allows the user of that telephone to begin listening to the contents of the electronic mail. In providing a unified message service, for example, the CTI server cooperates with a WWW (world wide web) server, so that the WWW server can turn some (portions made up of sentences) of content (for example a web page) submitted on a computer network such as the internet into speech output.

A speech synthesizer of the related art, particularly a speech synthesizer installed in a CTI server, is usually made to cope specifically with one particular language, for example Japanese. On the other hand, items to be converted, such as electronic mail etc. exist in various languages such as Japanese and English.

Accordingly, with the speech synthesizer of the related art, it was not really possible to correctly carry out conversion to speech data by matching the language supported by the speech synthesizer with the language of text data to be converted. For example, if an English sentence is converted using a speech synthesizer that supports Japanese, the sentence structures are different in Japanese and English with respect to syntax, grammar etc., which means that compared to when conversion is carried out using a speech synthesizer supporting English, it was difficult to provide high quality speech output because correct speech output was not possible and speech output was not fluent.

Particularly in the CTI system, in the case where speech output is carried out using the unified message service, high quality speech output can not be carried out because the telephone subscriber judges the content of electronic mail etc. only from results of speech output, with the result that erroneous contents may be conveyed.

SUMMARY OF THE INVENTION

The object of the present invention is to provide a speech synthesizer that can perform high quality speech output, even when text data to be converted is in various languages.

In order to achieve the above described object, a speech synthesizer of the present invention is provided with a plurality of voice synthesizing means for converting text data to speech data, with each speech synthesizing means converting text data in different languages to speech data in languages corresponding to those of the text data, wherein conversion of specific text data to speech data is selectively carried out by one of the plurality of speech synthesizing means.

With the above described speech synthesizer, a plurality of speech synthesizing means supporting respectively different languages are provided, and one of the plurality of speech synthesizing means selectively carries out conversion from text data to speech data. Accordingly, by using this speech synthesizer it is possible to carry out conversion to speech data even if text data in various languages are to be converted, by using the speech synthesizing means supporting each language.

DESCRIPTION OF THE PREFERRED EMBODIMENTS

The speech synthesizer of the present invention will be described in the following based on the drawings. Here description will be given using examples where the invention is applied to a voice synthesizer used in a CTI system.

First Embodiment

Figure 1:
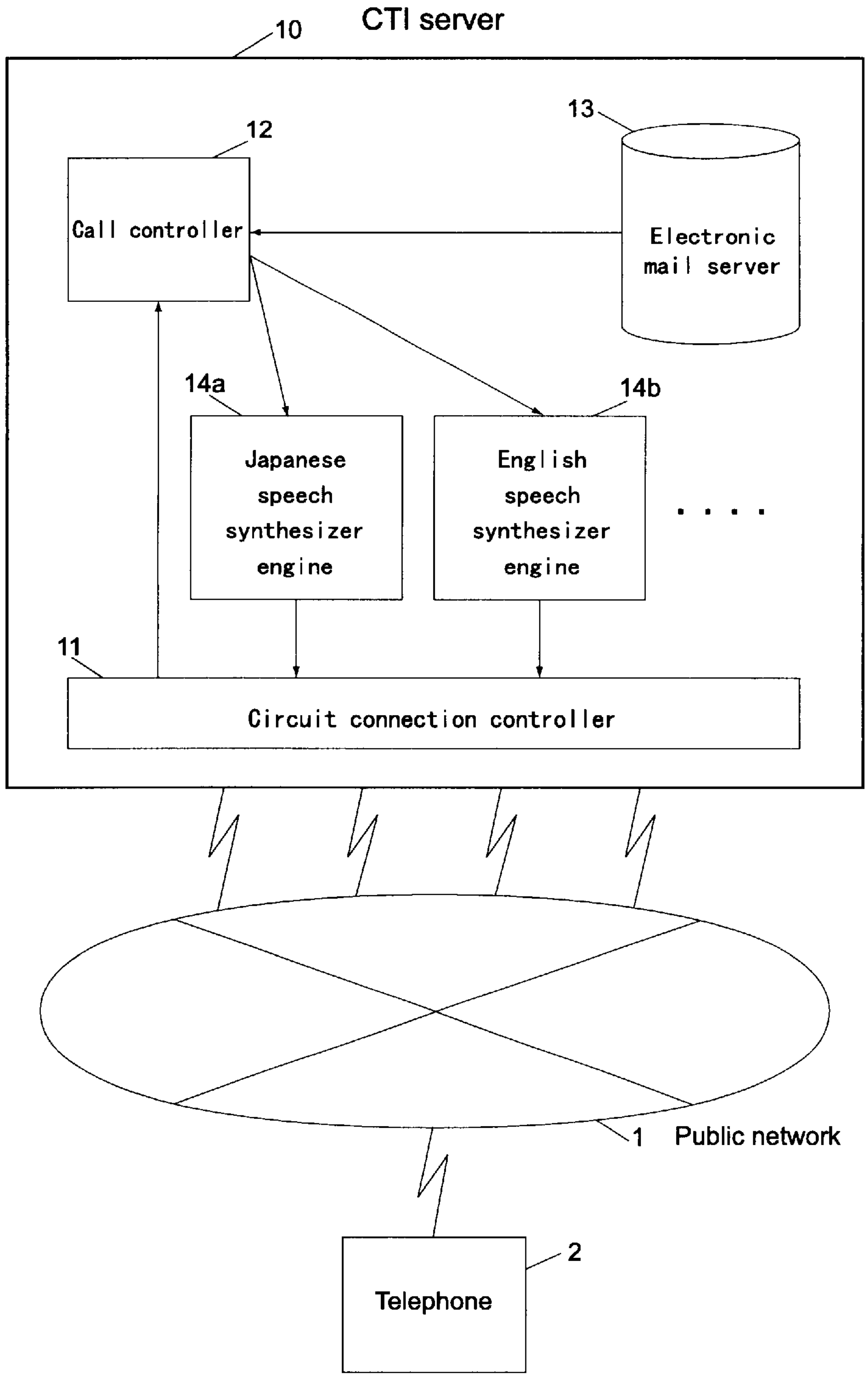
FIG. 1 is a schematic diagram showing the system configuration of a first embodiment of a CTI system using the speech synthesizer of the present invention.

As shown in FIG. 1, the CTI system of the first embodiment comprises telephones 2 on the public network 1, and a CTI server 10 for connecting to the public network 1.

The telephones 2 are connected to the public network by line or radio, and are used for making calls to other subscribers on the public network.

On the other hand, the CTI server 10 functions as a computer connected to a computer network such as the internet (not shown in the drawings), and provides a unified message service for telephones 2 on the public network 1. In order to do all this, the CTI server 10 comprises a circuit connection controller 11, a call controller 12, an electronic mail server 13, and a plurality of speech synthesizer engines 14*a*, 14*b* . . .

The circuit connection controller 11 comprises a communication interface for connecting to the public network 1, for example, and sets up calls between telephones 2 on the public network 1. Specifically, the circuit connection controller receives and processes an outgoing call from a telephone 2, and sends speech data to the telephone 2. The circuit connection controller 11 functions to perform communication between a plurality of telephones 2 on the public network 1 at the same time, which means ensuring connections between the public network 1 and a plurality of circuit sections.

The call controller 12 is realized as a CPU (Central Processing Unit) in the CTI server 10, and a control program executed by the CPU, and provides a unified message service by carrying out operational control that will be described in detail later.

The electronic mail server 13 comprises, for example, a non volatile storage device such as a hard disk, and is responsible for storing electronic mail sent and received on the computer network. The electronic mail server 13 can also be provided on the computer network separately from the CTI server 10.

The plurality of speech synthesizer engines 14*a*, 14*b* . . . are implemented as hardware (for example using speech synthesizer LSIs) or as software (for example as a speech synthesizer program to be executed by the CPU), and convert received text data into speech data using a well known technique such as waveform convolution. These speech synthesizer engines 14*a* . . . 14*b* . . . respectively support different natural languages (Japanese, English, French, Chinese, etc.). That is, each of the speech synthesizer engines 14*a*, 14*b* . . . respectively synthesizes speech according to the language. For example, among the speech synthesizer engine 14*a*, 14*b* . . . , one of them is a Japanese speech synthesizer engine 14*a* for converting Japanese text data into Japanese speech data, and another is an English speech synthesizer engine 14*b* for converting English text data into English speech data. Which of the speech synthesizer engines 14*a*, 14*b* . . . supports which language is determined in advance.

The CTI server 10 realizes the function of the speech synthesizer of the present invention using the circuit connection controller 11, call controller 12 and speech synthesizer engines 14*a*, 14*b* . . .

Next, an example of the processing operation when providing a unified message service in a CTI system having the above described structure will be described. Specifically, an example will be described of outputting the contents of electronic mail to a telephone 2 on the public network 1 as speech data.

Figure 2:
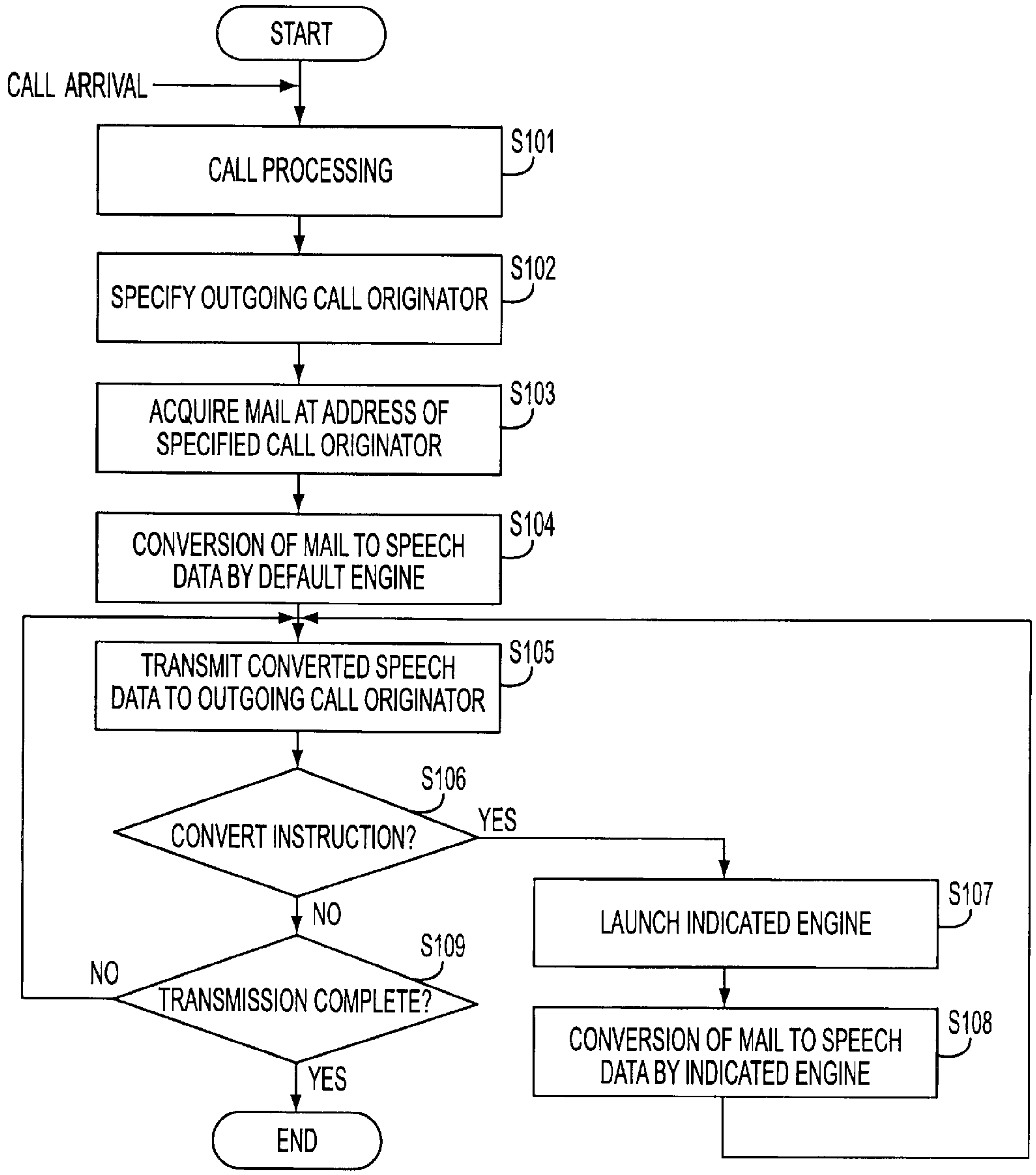
FIG. 2 is a flow chart showing an example of a processing operation for providing a unified message service in the CTI system of FIG. 1.

FIG. 2 is a flow chart showing an example of a processing operation in a first embodiment of a CTI system using the speech synthesizer of the present invention.

With this CTI system, if a call is originated from a telephone 2 to the CTI server 10, the CTO server commences provision of the unified message service. Specifically, if the user of the telephone 2 originates a call by designating a dialed number of the CTI server 10, the circuit connection controller 11 receives this call in the CTI server 10, and call processing for the received outgoing call is carried out (step 101, in the following "step" will be abbreviated to S). That is, in response to a call originated from the telephone 2, the circuit connection controller 11 sets up a circuit connection to that telephone, and notifies the call controller 12 that a call has been received from the telephone 2.

Upon notification of call receipt from the circuit connection controller 11, the call controller 12 specifies the email address of a user, being the originator of the outgoing call now received (S102). This address specification can be carried out by recognizing that after a message such as "please input email address" has been transmitted to the telephone connected to the circuit, using, for example, the speech synthesizer engines 14*a*, 14*b* . . . , there has been push button (hereinafter abbreviated to PB) input performed by the user of the telephone 2 in response to that message. Also, when the CTI server 10 is provided with a speech recognition engine having a voice recognition function, it is possible to confirm input by recognizing speech input by the user of the telephone 2 in response to the above described message. The speech recognition function is a well known technique, and so detailed description thereof will be omitted.

If the mail address of the user who is caller is specified, the call controller 12 accesses the electronic mail server 13 to acquire electronic mail at the specified address from the electronic mail server 13 (S103). The contents of the acquired email will then be converted to speech data, and so the call controller 12 transmits text data corresponding to the contents of the electronic mail to a predetermined default speech synthesizer engine, for example the Japanese speech synthesizer engine 14*a*, and the text data is converted to speech data by the default speech synthesizer engine (S104).

If conversion of the text data to speech data is performed, the circuit connection controller 11 transmits the speech data after conversion to the telephone 2 connected to a circuit, namely to the user who originated the call, via the public network 1 (S105). In this way, the contents of electronic mail are output as speech at the telephone 2 and the user of that telephone 2 can be made aware of the contents of the electronic mail by listening to this speech output.

However, electronic mail that is to be subjected to conversion to speech data is not necessarily limited to descriptions in the language handled by the default engine. That is, it can also be considered to have descriptions in a different language for each electronic mail or for each portion constituting the electronic mail (for example, sentence units).

For this reason, with this CTI server in the case where, for example, the Japanese speech synthesizer engine 14*a* is the default engine, the user of the telephone 2 will continue to hear the speech data as it is if the contents of the electronic mail are Japanese, but if the contents of the electronic mail are in another language (for example English) the speech synthesizer engines 14*a*, 14*b* . . . are switched over as a result of a specified operation executed at the telephone 2. Pushing buttons corresponding to each language can be considered as the specified operation at this time (for example, dialing "9" if it is English). If the CTI server is equipped with a speech recognition engine, it is also possible to perform speech input corresponding to each language (for example saying "English").

After that, while the circuit connection controller 11 is transmitting speech data, whether or not specified processing is carried out at the telephone 2 of the person the data is being sent to, namely, whether or not there us a speech synthesizer engine switch over instruction from that telephone 2, is monitored by the call controller 12 (S106). If there is a switch over instruction from the telephone 2, the call controller 12 launches the speech synthesizer engine handling the indicated language, for example the English speech synthesizer engine 14*b*, and causes the default engine to halt (S107). After that, the call controller 12 transmits the electronic mail acquired from the electronic mail server 13 to the newly launched English speech synthesizer engine 14*b* to allow the text data of that electronic mail to be converted to speech data (S108).

In other words, the call controller 12 selects one engine of the speech synthesizer engines 14*a*, 14*b*. . . , to convert text data contained in electronic mail acquired from the electronic mail server 13 to speech data, and the appropriate conversion is carried out by the selected speech synthesizer engine 14*a*, 14*b* . . . The selection at this time is determined by the call controller 12 based on the switching instruction from the telephone 2.

In this way, if, for example, the newly launched English speech synthesizer engine 14*b* carries out conversion to speech data, the circuit connection controller 11 transmits the speech data after conversion to the telephone 2 (S105), as in the case for the default engine. As a result, in the telephone 2, the contents of the electronic mail are converted to speech data by a speech synthesizer engine 14*a*, 14*b* . . . handling the language that the electronic mail is described in, and output as speech data. Accordingly, correct speech output is possible, and the problem of speech output that is not fluent does not arise.

Subsequently, in the case where the contents of an electronic mail change to another language, or return to the original language (the default language), it is possible to carry out conversion to speech data in the speech synthesizer engine 14*a*, 14*b* . . . corresponding to the language, by carrying out the same processing as described above. The call controller 12 repeatedly executes the above processing (S105–S108) until conversion to speech data and transmission to the telephone 2 is completed (S109) for electronic mail from all addresses of the call originator.

As has been described above, the CTI server 10 of this embodiment is provided with a plurality of speech synthesizer engines 14*a*, 14*b*, . . . respectively dealing with different languages, and one of these speech synthesizer engines selectively performs conversion from text data to speech data, which means that regardless of whether electronic mail is written in Japanese, English or another language conversion to speech data is possible using a speech synthesizer engine dedicated to dealing with the respective language. Accordingly, with this CTI server 10, even if the sentence structure etc. differs for each language, correct speech output is made possible, and speech output that is not fluent is prevented, and as a result, it is possible to provide high quality speech output.

In particular, with the CTl system of this embodiment, the CTI server 10 provides a unified message service, in which contents of email for a telephone 2 on the public network are output as speech in response to a request from that telephone 2. Namely, in the case of providing a unified message service, it is possible to provide a higher quality electronic mail reading (speech output) system than in the related art. Accordingly, in this CTI system, even if the user of the telephone 2 determines the content of electronic mail from only the results of speech output, it is possible to significantly reduce the conveying of erroneous content.

Also, with the CTI server 10 of this embodiment, there is selection of one speech synthesizer engine from the plurality of speech synthesizer engines 14*a*, 14*b* . . . , and this selection is determined by the call controller 12 based on a switching instruction from the telephone 2. Accordingly, even in the case where, for example, speech output is to be carried out for electronic mail written in a plurality of different languages, or where sentences written in different languages exist in a single electronic mail, the user of the telephone 2 can instruct switching of the speech synthesizer engines 14*a*, 14*b* . . . as required, and it is possible to carry out high quality speech output for each electronic mail or sentence.

Second Embodiment

Next, a second embodiment of a CTI system using the speech synthesizer of the present invention will be described. Structural elements that are the same as those in the above described first embodiment have the same reference numerals, and will not be described again.

Figure 3:
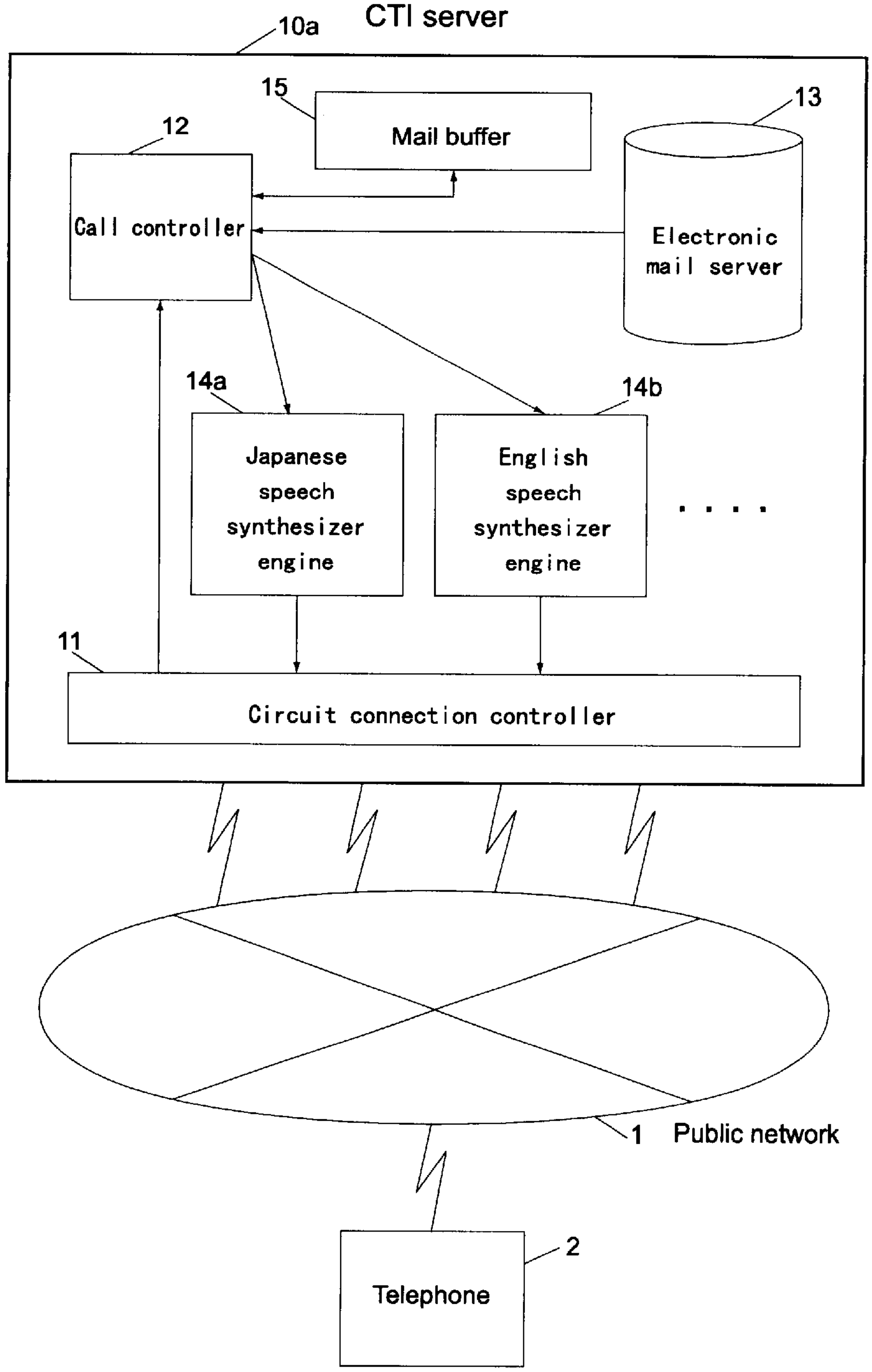
FIG. 3 is a schematic diagram showing the system configuration of a second embodiment of a CTI system using the speech synthesizer of the present invention.

FIG. 3 is a schematic diagram showing the system structure of the second embodiment of a CTI system using the speech synthesizer of the present invention.

As shown in FIG. 3, the CTI system of this embodiment is the same as for the first embodiment, but a mail buffer 15 is additionally provided in the CTI server 10*a*.

The mail buffer 15 is constituted, for example, by a memory region reserved in RAM (Random Access Memory) or a hard disk provided in the CTI server 10*a* and functions to temporarily buffer electronic mail acquired by the call controller 12 from the electronic mail server 13. Accompanying the provision of this mail buffer 15, operational control to be performed by the call controller 12 is slightly different from that in the case of the first embodiment, as will be described in detail later.

An example of the processing operation of the CTI system of this embodiment will be described for the case of providing a unified message service.

Figure 4:
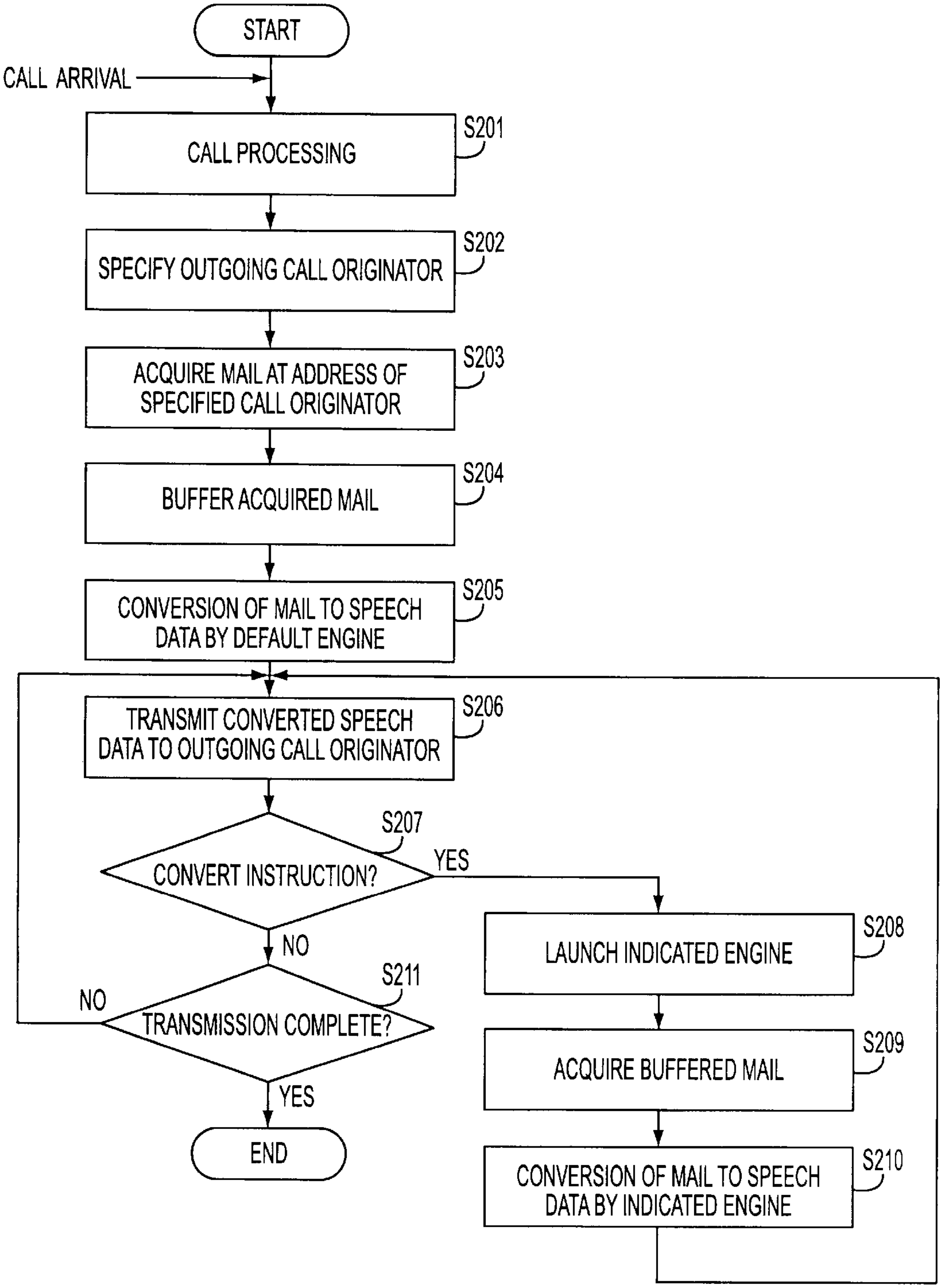
FIG. 4 is a flow chart showing an example of a processing operation for providing a unified message service in the CTI system of FIG. 3.

FIG. 4 is a flow chart showing one example of a processing operation for the second embodiment of the CTI system using the speech synthesizer of the present invention.

Similarly to the first embodiment, in the case of providing a unified message service, with this CTI system also, in the CTI server 10*a*, the circuit connection controller 11 performs call processing (S201), the call controller 12 specifies the originator of the outgoing call (S202), and then the call controller 12 acquires electronic mail at the address of that call originator from the electronic mail server 13 (S203). Once electronic mail is acquired, the call controller 12 buffers text data contained in the electronic mail in the buffer 15 in parallel with transmitting that text data to the default engine (S204), which is different from the first embodiment. This buffering operation is carried out in units of sentences making up the electronic mail, units of paragraphs comprising a few sentences, or in units of electronic mail. Specifically, only sentences, paragraphs or electronic mail (hereafter referred to as sentences etc.) currently being processed by the speech synthesizer engines 14*a*, 14*b* . . . are normally held in the buffer 15, and sentences etc. that have completed processing are deleted (cleared) from the buffer at the time that processing ends. In order to do this, the call controller 12 manages buffering of the buffer 15 by monitoring the processing condition in each of the speech synthesizer engines 14*a*, 14*b* . . . and recognizing characters equivalent to breaks between sentences, such as fall stops, and control commands equivalent to breaks between paragraphs or electronic mail. Whether buffering is carried out in units of sentences, paragraphs or electronic mail is set in advance.

In parallel with this buffering operation, if the default engine converts text data from the call controller 12 to speech data (S205), the circuit connection controller 11 transmits that speech data after conversion to the telephone 2 of the call originator (S206), the same as in the first embodiment. While this is going on, the call controller 12 monitors whether or not there is an instruction to switch the speech synthesizer engines 14*a*, 14*b* . . . from the telephone 2 to which the speech data is to be transmitted (S207).

If there is a switching instruction from the telephone 2, the call controller 12 launches the speech synthesizer engine corresponding to the indicated language, and halts the default engine (S208). However, differing from the case of the first embodiment, the call controller 12 extracts the text data buffered in the buffer 15 (S209), and transmits this text data to the newly launched speech synthesizer engine to allow conversion to speech data (S210). In this way, the newly launched speech synthesizer engine goes back to the beginning of the sentence etc. that was being processed by the default engine, and carries out conversion to speech data again.

After that, the circuit connection controller 11 transmits the speech data converted by the newly launched speech synthesizer engine to the telephone 2 (S206), similarly to the first embodiment. The call controller 12 repeatedly executes the above processing (S206–S210) until conversion to speech data and transmission to the telephone 2 is completed (S211) for electronic mail from all addresses of the call originator. In this way, in the telephone 2, even if there is an instruction to switch the speech synthesizer engines 14*a*, 14*b* . . . while outputting speech, it is possible to read the sentence etc. that has already been output as speech using the default engine again using the new speech synthesizer engine. After that, processing is the same if other instructions to switch speech synthesizer engines is received.

As has been described above, with the CTI server 10*a* of this embodiment, a mail buffer 15 for storing text data acquired from the electronic mail server 13 is provided, and if selection of the speech synthesizer engines 14*a*, 14*b* . . . is switched during conversion of particular text data, conversion to speech data is carried out for the text data stored in the mail buffer 15 using a speech synthesizer engine newly selected by this switching. In other words, it is possible to return to the beginning of the particular sentence etc. being handled at the time of switching the speech synthesizer engines 14*a*, 14*b* . . . , and read again using the new speech synthesizer engine. Accordingly, since with this embodiment portions that have already been read at the time of switching the speech synthesizer engines 14*a*, 14*b* . . . are read again by the new speech synthesizer engine, it is possible to perform even better read out than in the first embodiment in which reading out from the first sentence is effected after switching speech synthesizer engines 14*a*, 14*b* . . . using the new speech synthesizer engine.

Third Embodiment

Next, a third embodiment of a CTI system using the speech synthesizer of the present invention will be described. Structural elements that are the same as those in the above described first embodiment have the same reference numerals, and will not be described again.

Figure 5:
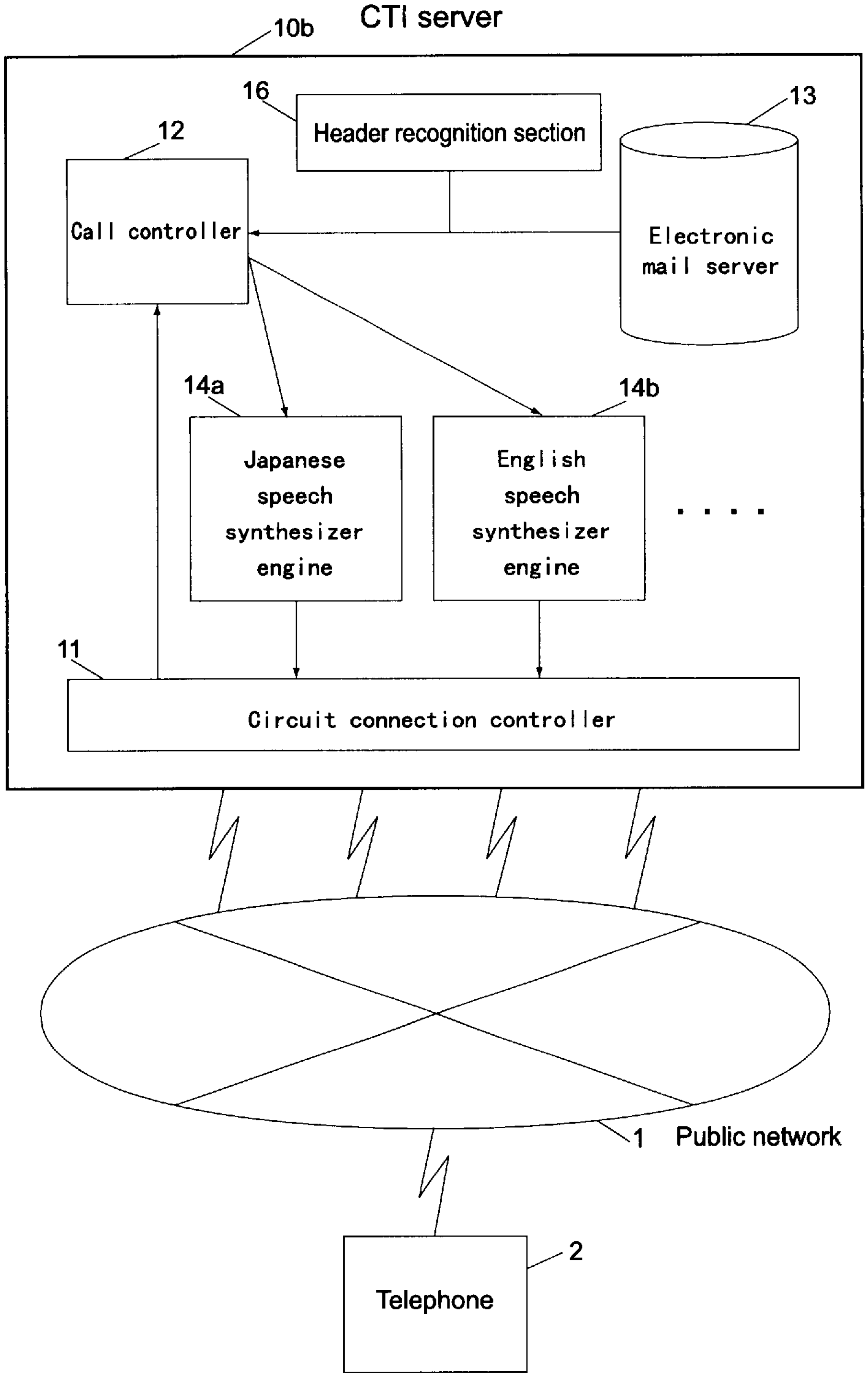
FIG. 5 is a schematic diagram showing the system configuration of a third embodiment of a CTI system using the speech synthesizer of the present invention.

FIG. 5 is a schematic diagram showing the system structure of the third embodiment of a CTI system using the speech synthesizer of the present invention.

As shown in FIG. 5, the CTI system of this embodiment is the same as the first embodiment, but a header recognition section 16 is additionally provided in the CTI server 10*b*.

The header recognition section 16 is implemented as, for example, a specified program executed by the CPU of the CTI server 10*b*, and recognizes the language of the text data acquired from the electronic mail server. This recognition can be carried out based on character code information contained in a header section of the electronic mail acquired from the electronic mail server 13. For example, with one internet protocol, according to MIME (Multipurpose Internet Mail Extension) that conforms to RFC1341 for multimedia electronic mail use, "charset" exists in the header section of the electronic mail as information relating to the character code in which the text data contiguous to the header section is written. This "charset" is normally uniquely coordinated with the language (Japanese, English, French, Chinese, etc.). Accordingly, it is possible to recognize the language in the header recognition section 16 if the electronic mail conforms to MIME, by identifying "charset".

Also, along with providing this type of header recognition section 16, the call controller 12 is different from that in the first embodiment, and operational control is carried out as will be described in detail later.

An example of a processing operation for the case of providing a unified message service in the CTI system of this embodiment will now be described.

Figure 6:
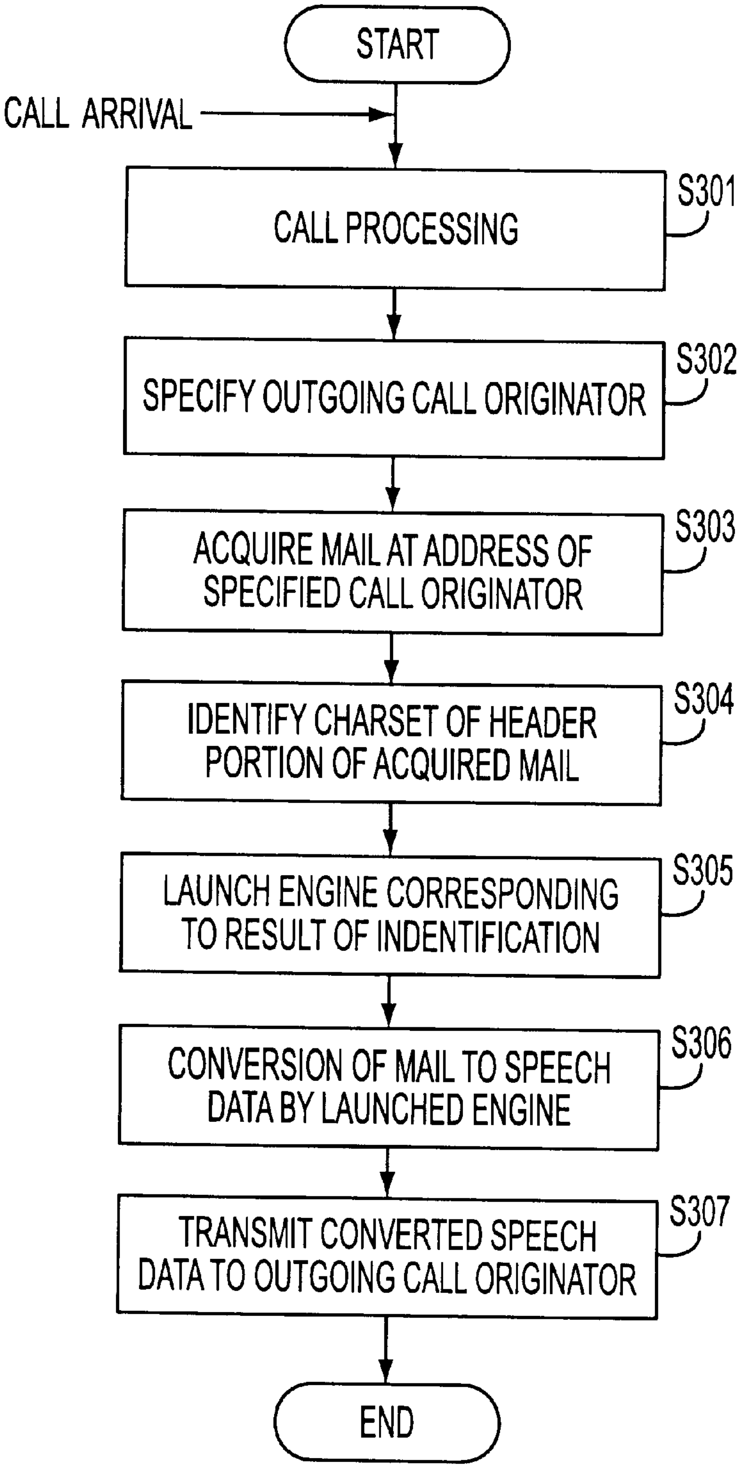
FIG. 6 is a flow chart showing an example of a processing operation for providing a unified message service in the CTI system of FIG. 5.

FIG. 6 is a flow chart showing one example of a processing operation for the third embodiment of a CTI system using the speech synthesizer of the present invention.

Similarly to the first embodiment, in the case of providing a unified message service, with this CTI system also, in the CTI server 10*b*, the circuit connection controller 11 performs call processing (S301), the call controller 12 specifies the originator of the outgoing call (S302), and then the call controller 12 acquires electronic mail at the address of that call originator from the electronic mail server 13 (S303).

However, this CTI system differs from the case of the first embodiment in that when the call controller 12 acquires the electronic mail, the header recognition section 16 identifies "charset" contained in a header section of the electronic mail, to recognize the language of text data contiguous to that header section (S304). This recognition is carried out for every electronic mail header. Accordingly, for example, even if there are Japanese sentences and English sentences in a single electronic mail, there is a header section corresponding to each sentence which means the language is recognized for each sentence. Once the language is recognized, the header recognition section 16 notifies the recognition result to the call controller 12.

Upon notification of the recognition result from the header recognition section 16, the call controller 12 launches the speech synthesizer engine corresponding to the recognized language (S305). For example, if the recognition result obtained by the header recognition section 16 is Japanese, the call controller 12 launches the Japanese speech synthesizer engine 14*a*. Similarly, in the case that the recognition result obtained by the header recognition section 16 is English, the call controller 12 launches the English speech synthesizer engine 14*b*. The call controller 12 then transmits text data acquired from the electronic mail server 13 to the speech synthesizer engine that has been launched, and causes that text data to be converted to speech data (S306).

In other words, the call controller 12 selects one of the speech synthesizer engines 14*a*, 14*b* . . . based on the result of recognition notified from the header recognition section 16, and causes conversion to speech data in the selected speech synthesizer engine. Since language recognition is carried out for every electronic mail header section, as described above, in the case, for example, where there are Japanese sentences and English sentences in a single electronic mail, a header section also exists for each sentence, and so the call controller 12 selectively switches between the Japanese speech synthesizer engine 14*a* and the English speech synthesizer engine 14*b* according to the respective recognition results.

After that, the circuit connection controller 11 transmits the speech data after conversion to the telephone of the originator of the outgoing call (S307). The call controller 12 repeatedly executes the above processing until conversion to speech data and transmission to the telephone 2 is completed for electronic mail from all addresses of the call originator. In this way, in the telephone 2, the contents of the electronic mail are converted to speech data by the speech synthesizer engines 14*a*, 14*b* . . . according to the language of the electronic mail, and speech is output, enabling the user of the telephone 2 to hear that speech output to understand the contents of the electronic mail.

As has been described above, the CTI server 10*b* of this embodiment is provided with the header recognition section 16 for recognizing the language of text data acquired from the electronic mail server 13, and based on recognition results obtained by the header recognition section 16 the call controller 12 selects one of the plurality of speech synthesizer engines 14*a*, 14*b* . . . and causes conversion to speech data in the selected speech synthesizer engine. In other words, since the speech synthesizer engines 14*a*, 14*b* . . . are selected depending on the recognition results obtained by the header recognition section 16, it is possible to automatically switch to a speech engine 14*a*, 14*b* . . . appropriate for the language of the electronic mail that is to be converted without waiting for an instruction from the telephone 2, as is the case with the first and second embodiments.

Accordingly, with this embodiment, it is possible to perform appropriate speech read out according to the language of the electronic mail to be converted, and it is possible to reduce the effort on the user side to achieve rapid processing.

In the above described first to third embodiments, examples have been described where conversion to speech data is carried out for text data contained in electronic mail acquired from a electronic mail server 13, but the present invention is not limited to this and can be similarly applied to other text data. It is possible to consider data contained in content (web pages) transmitted over a computer network such as the internet, namely data being in the form of sentences as contained within the content, as other text data. In this case, if character code is written in a HTML (hyper text Markup Language) tag to which the content conforms, it is possible to automatically select the speech synthesizer engines 14*a*, 14*b* . . . based on that character code information, as described in the third embodiment. In a system provided with an OCR (optical character reader), it is also possible to consider data read out from this OCR as other text.

Also, in the above described first to third examples have been described where the present invention is applied to a speech synthesizer used in a CTI system, speech data after conversion is transmitted to a telephone 2 on the public network and speech output is performed at that telephone 2, but the present invention is not limited to this. For example, even when speech output is carried out via a speaker provided in the system, such as in a speech synthesizer used in a ticketing system, by applying the present invention it is possible to realize high quality speech output.

As has been described above, the speech synthesizer of the present invention is provided with a plurality of speech synthesizing means respectively handling different languages, and by selectively carrying out conversion from text data to speech data using one of the plurality speech synthesizing means it is possible to carry out conversion from text data to speech data regardless of whether the text data is Japanese, English or any other language using a speech synthesizing means handling the respective language. Accordingly, by using this speech synthesizing means, even if the sentence structure etc., differs for each language there are no problems such as being unable to provide correct speech output or outputting speech output that is not fluent, and as a result, it is possible to realize high quality speech output.

What is claimed is:

1. A speech synthesizer comprising:

communication control means for carrying out communication between telephones on a public network;

data acquisition means for obtaining text data from a server for managing text data indicated from a telephone, when the communication control means receives a call from the telephone;

a plurality of speech synthesizing means, for each of a plurality of languages, for converting text data in different languages to speech data in that language, and transmitting the speech data after conversion to the telephone via the communication control means; and conversion control means for deciding which speech synthesizing means, among the plurality of speech synthesizing means, is to perform conversion of the text data acquired by the data acquisition means to speech data, wherein text data acquired by the data acquisition means is text data contained in electronic mail acquired from an electronic mail server.

2. A speech synthesizer comprising:

communication control means for carrying out communication between telephones on a public network;

data acquisition means for obtaining text data from a server for managing text data indicated from a telephone, when the communication control means receives a call from the telephone;

a plurality of speech synthesizing means, for each of a plurality of languages, for converting text data in different languages to speech data in that language, and transmitting the speech data after conversion to the telephone via the communication control means; and conversion control means for deciding which speech synthesizing means, among the plurality of speech synthesizing means, is to perform conversion of the text data acquired by the data acquisition means to speech data, wherein text data acquired by the data acquisition means is text data contained in content acquired from a WWW server.

3. A speech synthesizer comprising:

communication control means for carrying out communication between telephones on a public network;

data acquisition means for obtaining text data from a server for managing text data indicated from a telephone, when the communication control means receives a call from the telephone;

a plurality of speech synthesizing means, for each of a plurality of languages, for converting text data in different languages to speech data in that language, and transmitting the speech data after conversion to the telephone via the communication control means; and conversion control means for deciding which speech synthesizing means, among the plurality of speech synthesizing means, is to perform conversion of the text data acquired by the data acquisition means to speech data, wherein, based on an instruction provided using the telephone, the conversion control means selects one of the plurality of speech synthesizing means and causes conversion to speech data in the selected speech synthesizing means, and wherein text data acquired by the data acquisition means is text data contained in electronic mail acquired from an electronic mail server.

4. A speech synthesizer comprising:

communication control means for carrying out communication between telephones on a public network;

data acquisition means for obtaining text data from a server for managing text data indicated from a telephone, when the communication control means receives a call from the telephone;

buffer means for holding text data acquired by the data acquisition means;

a plurality of speech synthesizing means, for each of a plurality of languages, for converting text data in different languages to speech data in that language, and transmitting the speech data after conversion to the telephone via the communication control means; and conversion control means for deciding which speech of synthesizing means, among the plurality of speech synthesizing means, is to perform conversion of the text data acquired by the data acquisition means to speech data, wherein, based on an instruction provided using the telephone the conversion control means selects one of the plurality of speech synthesizing means and causes conversion to speech data in the selected speech synthesizing means, wherein, if the conversion control means switches selection of the speech synthesizing means during conversion of particular text data, conversion to speech data of text data held in the buffer means is carried out in the speech synthesizing means newly selected as a result of the switch, and wherein text data acquired by the data acquisition means is text data contained in electronic mail acquired from an electronic mail server.

5. A speech synthesizer comprising:

communication control means for carrying out communication between telephones on a public network;

data acquisition means for obtaining text data from a server for managing text data indicated from a telephone, when the communication control means receives a call from the telephone;

recognition means for recognizing the language of text data acquired by the data acquisition means;

a plurality of speech synthesizing means, for each of a plurality of languages, for converting text data in different languages to speech data in that language, and transmitting the speech data after conversion to the telephone via the communication control means; and conversion control means for deciding which speech synthesizing means, among the plurality of speech synthesizing means, is to perform conversion of the text data acquired by the data acquisition means to speech data, wherein, based on an instruction provided using the telephone, the conversion control means selects one of the plurality of speech synthesizing means and causes conversion to speech data in the selected speech synthesizing means, wherein the conversion controller selects one of the plurality of speech synthesizing means based on a recognition result from the recognition means, and causes conversion to speech data to be carried out in the selected speech synthesizing means, and wherein text data acquired by the data acquisition means is text data contained in electronic mail acquired from an electronic mail server.

6. A speech synthesizer comprising:

communication control means for carrying out communication between telephones on a public network;

data acquisition means for obtaining text data from a server for managing text data indicated from a telephone, when the communication control means receives a call from the telephone;

a plurality of speech synthesizing means, for each of a plurality of languages, for converting text data in different languages to speech data in that language, and transmitting the speech data after conversion to the telephone via the communication control means; and conversion control means for deciding which speech synthesizing means, among the plurality of speech synthesizing means, is to perform conversion of the text data acquired by the data acquisition means to speech data, wherein, based on an instruction provided using the telephone, the conversion control means selects one of the plurality of speech synthesizing means and causes conversion to speech data in the selected speech synthesizing means, and wherein text data acquired by the data acquisition means is text data contained in content acquired from a WWW server.

7. A speech synthesizer comprising:

communication control means for carrying out communication between telephones on a public network;

data acquisition means for obtaining text data from a server for managing text data indicated from a telephone, when the communication control means receives a call from the telephone;

buffer means for holding text data acquired by the data acquisition means;

a plurality of speech synthesizing means, for each of a plurality of languages, for converting text data in different languages to speech data in that language, and transmitting the speech data after conversion to the telephone via the communication control means; and conversion control means for deciding which speech synthesizing means, among the plurality of speech synthesizing means, is to perform conversion of the text data acquired by the data acquisition means to speech data, wherein, based on an instruction provided using the telephone, the conversion control means selects one of the plurality of speech synthesizing means and causes conversion to speech data in the selected speech synthesizing means, wherein, if the conversion control means switches selection of the speech synthesizing means during conversion of particular text data, conversion to speech data of text data held in the buffer means is carried out in the speech synthesizing means newly selected as a result of the switch, and wherein text data acquired by the data acquisition means is text data contained in content acquired from a WWW server.

8. A speech synthesizer comprising:

communication control means for carrying out communication between telephones on a public network;

data acquisition means for obtaining text data from a server for managing text data indicated from a telephone, when the communication control means receives a call from the telephone;

recognition means for recognizing the language of text data acquired by the data acquisition means;

a plurality of speech synthesizing means, for each of a plurality of languages, for converting text data in different languages to speech data in that language, and transmitting the speech data after conversion to the telephone via the communication control means; and conversion control means for deciding which speech synthesizing means, among the plurality of speech synthesizing means, is to perform conversion of the text data acquired by the data acquisition means to speech data, wherein, based on an instruction provided using the telephone, the conversion control means selects one of the plurality of speech synthesizing means and causes conversion to speech data in the selected speech synthesizing means, wherein the conversion controller selects one of the plurality of speech synthesizing means based on a recognition result from the recognition means, and causes conversion to speech data to be carried out in the selected speech synthesizing means, and wherein text data acquired by the data acquisition means is text data contained in content acquired from a WWW server.

9. A speech synthesizer comprising:

a circuit connection controller, the circuit connection controller providing for communications between telephone units;

a plurality of speech synthesizers, each for translating text data into speech data in a different respective language;

a call controller, the call controller controlling the operation of the circuit connection controller and the plurality of speech synthesizers, the call controller selecting a particular one of the speech synthesizers to translate the text data, wherein the text data comprises at least one of text data from electronic mail and text data from a WWW source.

10. A speech synthesizer according to claim 9, further comprising:

a data server that receives and stores text data.

11. A speech synthesizer according to claim 10, wherein the call controller receives indication of initiation of a call from the circuit connection controller and accesses text data stored in the data server corresponding to the originator of the call.

12. The speech synthesizer according to claim 9, wherein the call controller selects one of the plurality of speech synthesizers based on information received by the circuit connection controller from an originator of a call.

13. The speech synthesizer according to claim 9, further comprising:

a header recognition section, the header recognition section determining the language content of text data, and wherein the call controller selects one of the plurality of speech synthesizers based on the determination of language content by the header recognition section.

14. The speech synthesizer according to claim 9, wherein the call controller comprises:

a CPU, the CPU executing a control program.

15. The speech synthesizer according to claim 9, wherein each of the plurality of speech synthesizers comprises a hardware implementation of a speech synthesizer.

16. The speech synthesizer according to claim 9, wherein each of the plurality of speech synthesizers comprises a software implementation of a speech synthesizer to be executed by a CPU.

17. The speech synthesizer according to claim 9, further comprising:

a text data buffer, wherein the text data buffer stores text data currently being synthesized by one of the plurality of speech synthesizers and thereby permitting complete speech synthesis of all text data stored therein should it be necessary to switch to a different one of the plurality of speech synthesizers.

18. A method of speech synthesis comprising the steps of:

receiving and processing an outgoing call from a telephone unit;

specifying the originator of the outgoing call;

acquiring text data corresponding to the originator of the outgoing call, the text data comprising at least one of text data from electronic mail and text data from a WWW source;

converting the text data to speech data using one of a plurality of speech synthesizers corresponding to a respective plurality of different languages; and transmitting the speech data to the originator of the outgoing call.

19. The method according to claim 18, further comprising the steps of:

receiving an instruction from the originator of the outgoing call to use a different language to perform the step of converting;

selecting a corresponding one of the plurality of speech synthesizers corresponding to the different language; and converting the text data to speech data using the selected one of the plurality of speech synthesizers.

20. The method according to claim 19, further comprising the step of:

buffering the text data prior to conversion, wherein in the step of converting using the selected one of the plurality of speech synthesizers, the selected speech synthesizer converts the buffered text data.

21. The method according to claim 18, further comprising the steps of:

automatically determining the language of the text data; and selecting one of the plurality of speech synthesizers according to the language of the text data.

* * * * *